(12) United States Patent
Tindal et al.

(10) Patent No.: US 8,219,662 B2
(45) Date of Patent: Jul. 10, 2012

(54) REDIRECTING DATA GENERATED BY NETWORK DEVICES

(75) Inventors: Glen Tindal, Colorado Springs, CO (US); Jeffery A. Schenk, Cambria, CA (US)

(73) Assignee: International Business Machines Corporation, Armonk, NY (US)

( * ) Notice: Subject to any disclaimer, the term of this patent is extended or adjusted under 35 U.S.C. 154(b) by 3882 days.

(21) Appl. No.: 09/730,680

(22) Filed: Dec. 6, 2000

(65) Prior Publication Data

US 2002/0069340 A1 Jun. 6, 2002

(51) Int. Cl.
*G06F 15/173* (2006.01)
(52) U.S. Cl. ........ 709/224; 709/220; 709/221; 709/223; 709/238; 711/111; 711/203
(58) Field of Classification Search .......... 709/220–224; 714/4; 707/111, 203; 711/111, 203
See application file for complete search history.

(56) References Cited

U.S. PATENT DOCUMENTS

| | | |
|---|---|---|
| 4,991,089 A | 2/1991 | Shorter |
| 5,109,486 A | 4/1992 | Seymour |
| 5,159,685 A | 10/1992 | Kung |
| 5,442,791 A | 8/1995 | Wrabetz et al. |
| 5,475,819 A | 12/1995 | Miller et al. |
| 5,491,820 A | 2/1996 | Belove et al. |
| 5,506,966 A | 4/1996 | Ban |
| 5,519,704 A | 5/1996 | Farinacci et al. |
| 5,535,335 A | 7/1996 | Cox |
| 5,557,748 A | 9/1996 | Noris |
| 5,581,764 A | 12/1996 | Fitzgerald et al. |
| 5,659,746 A * | 8/1997 | Bankert et al. ................ 707/205 |
| 5,680,551 A | 10/1997 | Martin |
| 5,724,509 A | 3/1998 | Starkweather et al. |
| 5,726,883 A | 3/1998 | Levine et al. |
| 5,751,965 A | 5/1998 | Mayo |
| 5,751,967 A | 5/1998 | Raab et al. |
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |

(Continued)

FOREIGN PATENT DOCUMENTS

EP 0 384 339 A2 8/1990

(Continued)

OTHER PUBLICATIONS

Strassner, John; Technology Series—*Directory Enabled Networks*, 1999; MacMillan Technical Publishing USA.

(Continued)

*Primary Examiner* — Liangche A Wang
(74) *Attorney, Agent, or Firm* — Stephen J. Walder, Jr.; Jeffrey S. Labaw

(57) ABSTRACT

A system and method for efficiently and easily capturing data dumps generated by a network device is disclosed. In one embodiment, a storage management device is disposed between a network device and a storage device. The network device is programmed with a virtual address that is associated with the storage management device. Upon generating a data dump, the network device writes the data dump to the virtual address where the storage management device receives the data dump and redirects it to a long-term storage location. Additionally, the storage management device can generate a record of each data dump that indicates the network device that generated the data dump and where the data dump was stored.

23 Claims, 8 Drawing Sheets

U.S. PATENT DOCUMENTS

| | | |
|---|---|---|
| 5,812,768 A | 9/1998 | Page |
| 5,819,028 A | 10/1998 | Manghirmalani et al. |
| 5,819,042 A | 10/1998 | Hansen |
| 5,832,503 A * | 11/1998 | Malik et al. .................... 709/223 |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. |
| 5,878,432 A | 3/1999 | Misheski |
| 5,884,028 A | 3/1999 | Kindell et al. |
| 5,889,943 A | 3/1999 | Ji |
| 5,889,953 A | 3/1999 | Thebaut et al. |
| 5,901,320 A | 5/1999 | Takahashi |
| 5,920,701 A | 7/1999 | Miller et al. |
| 5,923,850 A | 7/1999 | Barroux |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A | 10/1999 | Nessett et al. |
| 5,974,236 A | 10/1999 | Sherman |
| 5,980,078 A | 11/1999 | Krivoshcin et al. |
| 5,999,948 A | 12/1999 | Nelson |
| 6,006,035 A | 12/1999 | Nabahi |
| 6,014,697 A | 1/2000 | Lewis |
| 6,016,306 A | 1/2000 | Le Boudec et al. |
| 6,023,586 A | 2/2000 | Gaisford et al. |
| 6,028,846 A | 2/2000 | Cain |
| 6,041,347 A | 3/2000 | Harsham et al. |
| 6,049,828 A | 4/2000 | Dev et al. |
| 6,055,568 A | 4/2000 | Adams |
| 6,085,253 A | 7/2000 | Blackwell |
| 6,088,804 A | 7/2000 | Hill |
| 6,097,697 A | 8/2000 | Yao et al. |
| 6,098,094 A | 8/2000 | Barnhouse et al. |
| 6,098,101 A | 8/2000 | Sears |
| 6,098,108 A | 8/2000 | Sridhar et al. |
| 6,101,508 A | 8/2000 | Wolff |
| 6,104,700 A | 8/2000 | Haddock et al. |
| 6,105,069 A | 8/2000 | Franklin et al. |
| 6,108,699 A | 8/2000 | Moiin |
| 6,108,703 A | 8/2000 | Leighton et al. |
| 6,122,664 A | 9/2000 | Boukobza et al. |
| 6,128,729 A | 10/2000 | Kimball et al. |
| 6,131,118 A | 10/2000 | Stupek, Jr. et al. |
| 6,131,119 A | 10/2000 | Fukui |
| 6,154,776 A | 11/2000 | Martin |
| 6,167,445 A | 12/2000 | Gai et al. |
| 6,170,009 B1 | 1/2001 | Mandal et al. |
| 6,170,011 B1 | 1/2001 | Macleod Beck et al. |
| 6,173,312 B1 * | 1/2001 | Atarashi et al. ............... 709/203 |
| 6,182,094 B1 | 1/2001 | Humpleman et al. |
| 6,198,479 B1 | 3/2001 | Humpleman et al. |
| 6,202,090 B1 * | 3/2001 | Simone .......................... 709/220 |
| 6,211,877 B1 | 4/2001 | Steele |
| 6,226,654 B1 | 5/2001 | Van Hoff |
| 6,240,458 B1 | 5/2001 | Gilbertson |
| 6,243,747 B1 | 6/2001 | Lewis et al. |
| 6,243,815 B1 | 6/2001 | Antur |
| 6,247,049 B1 | 6/2001 | Scott |
| 6,253,240 B1 | 6/2001 | Axberg |
| 6,260,072 B1 | 7/2001 | Rodriguez-Moral |
| 6,269,398 B1 | 7/2001 | Leong et al. |
| 6,272,526 B1 | 8/2001 | Robinson |
| 6,286,038 B1 | 9/2001 | Reichmeyer |
| 6,292,889 B1 | 9/2001 | Fitzgerald et al. |
| 6,338,149 B1 | 1/2002 | Ciccone |
| 6,349,306 B1 | 2/2002 | Malik et al. |
| 6,356,955 B1 * | 3/2002 | Hollberg et al. ............... 719/315 |
| 6,363,411 B1 | 3/2002 | Dugan et al. |
| 6,363,421 B2 | 3/2002 | Barker |
| 6,370,119 B1 | 4/2002 | Basso et al. |
| 6,374,293 B1 | 4/2002 | Dev |
| 6,381,631 B1 | 4/2002 | Van Hoff |
| 6,393,425 B1 | 5/2002 | Kelly |
| 6,418,468 B1 | 7/2002 | Ahlstrom et al. |
| 6,426,959 B1 | 7/2002 | Jacobson |
| 6,438,594 B1 | 8/2002 | Bowman-Amuah |
| 6,442,608 B1 | 8/2002 | Knight et al. |
| 6,449,638 B1 | 9/2002 | Wecker et al. |
| 6,449,646 B1 | 9/2002 | Sikora |
| 6,453,255 B1 | 9/2002 | Smorodinsky |
| 6,463,583 B1 | 10/2002 | Hammond |
| 6,466,580 B1 | 10/2002 | Leung |
| 6,470,453 B1 | 10/2002 | Vilhuber |
| 6,473,775 B1 | 10/2002 | Kusters |
| 6,496,843 B1 | 12/2002 | Getchius et al. |
| 6,496,858 B1 | 12/2002 | Frailong |
| 6,539,425 B1 | 3/2003 | Stevens et al. |
| 6,546,416 B1 | 4/2003 | Kirsch |
| 6,550,060 B1 | 4/2003 | Hammond |
| 6,564,056 B1 | 5/2003 | Fitzgerald |
| 6,567,406 B1 | 5/2003 | Skemer |
| 6,571,285 B1 | 5/2003 | Groath |
| 6,598,177 B1 * | 7/2003 | Jones et al. ...................... 714/30 |
| 6,609,108 B1 | 8/2003 | Pulliam et al. |
| 6,615,166 B1 | 9/2003 | Guheen et al. |
| 6,615,218 B2 | 9/2003 | Mandal |
| 6,625,590 B1 | 9/2003 | Chen et al. |
| 6,628,304 B2 | 9/2003 | Mitchell |
| 6,636,877 B1 | 10/2003 | Doleac et al. |
| 6,643,289 B1 | 11/2003 | Natanson |
| 6,643,640 B1 | 11/2003 | Getchius et al. |
| 6,654,799 B1 | 11/2003 | Tanaka |
| 6,658,526 B2 * | 12/2003 | Nguyen et al. ................ 711/111 |
| 6,678,370 B1 | 1/2004 | Freebersyser |
| 6,678,827 B1 | 1/2004 | Rothermel et al. |
| 6,684,241 B1 | 1/2004 | Sandick |
| 6,684,244 B1 | 1/2004 | Goldman et al. |
| 6,697,967 B1 | 2/2004 | Robertson |
| 6,725,233 B2 | 4/2004 | Froyd et al. |
| 6,725,262 B1 | 4/2004 | Choquier |
| 6,725,264 B1 | 4/2004 | Christy |
| 6,732,175 B1 | 5/2004 | Abjanic |
| 6,738,910 B1 | 5/2004 | Genty |
| 6,760,761 B1 | 7/2004 | Sciacca |
| 6,760,767 B1 | 7/2004 | Miesbauer |
| 6,766,369 B1 * | 7/2004 | Haitsuka et al. ............... 709/224 |
| 6,769,116 B1 * | 7/2004 | Sexton .......................... 717/130 |
| 6,772,206 B1 | 8/2004 | Lowry |
| 6,775,698 B1 * | 8/2004 | Simone .......................... 709/221 |
| 6,782,474 B1 | 8/2004 | Ylonen |
| 6,810,427 B1 | 10/2004 | Cain |
| 6,816,897 B2 | 11/2004 | McGuire |
| 6,826,597 B1 | 11/2004 | Lonnroth et al. |
| 6,832,247 B1 | 12/2004 | Cochran |
| 6,834,298 B1 | 12/2004 | Singer |
| 6,847,994 B1 * | 1/2005 | Akimoto et al. ............... 709/223 |
| 6,865,673 B1 | 3/2005 | Nessett |
| 6,895,431 B1 | 5/2005 | Bero |
| 6,895,588 B1 | 5/2005 | Ruberg |
| 6,907,572 B2 | 6/2005 | Little |
| 6,931,016 B1 | 8/2005 | Andersson |
| 6,931,444 B2 | 8/2005 | Schweitzer |
| 6,938,079 B1 | 8/2005 | Anderson |
| 6,959,332 B1 | 10/2005 | Zavalkovsky |
| 6,978,301 B2 | 12/2005 | Tindal |
| 6,990,591 B1 | 1/2006 | Pearson |
| 7,003,560 B1 | 2/2006 | Mullen |
| 7,016,955 B2 | 3/2006 | Martin |
| 7,127,526 B1 | 10/2006 | Duncan |
| 7,145,871 B2 | 12/2006 | Levy |
| 2001/0034771 A1 | 10/2001 | Hutsch |
| 2001/0053991 A1 | 12/2001 | Bonabeau |
| 2002/0007411 A1 | 1/2002 | Shaked |
| 2002/0032769 A1 | 3/2002 | Barkai et al. |
| 2002/0032775 A1 | 3/2002 | Venkataramaiah |
| 2002/0032871 A1 | 3/2002 | Malan |
| 2002/0038320 A1 | 3/2002 | Brook |
| 2002/0051080 A1 | 5/2002 | Tanaka |
| 2002/0052719 A1 | 5/2002 | Alexander |
| 2002/0069143 A1 | 6/2002 | Cepeda |
| 2002/0072956 A1 | 6/2002 | Willems |
| 2002/0078068 A1 | 6/2002 | Krishnaprasad |
| 2002/0078382 A1 | 6/2002 | Sheikh |
| 2002/0143927 A1 | 10/2002 | Maltz |

| | | | |
|---|---|---|---|
| 2002/0161863 A1 | 10/2002 | McGuire | |
| 2002/0169858 A1 | 11/2002 | Bellinger | |
| 2002/0171762 A1 | 11/2002 | Maxson et al. | |
| 2002/0173997 A1 | 11/2002 | Menard | |
| 2002/0174091 A1 | 11/2002 | Froyd et al. | |
| 2002/0191619 A1 | 12/2002 | Shafer | |
| 2002/0194289 A1 | 12/2002 | Engel | |
| 2002/0198974 A1 | 12/2002 | Shafer | |
| 2003/0016685 A1 | 1/2003 | Berggreen | |
| 2003/0018702 A1 | 1/2003 | Broughton | |
| 2003/0018765 A1 | 1/2003 | Muhlestein | |
| 2003/0033589 A1 | 2/2003 | Reyna et al. | |
| 2003/0037040 A1 | 2/2003 | Beadles et al. | |
| 2003/0048287 A1 | 3/2003 | Little et al. | |
| 2003/0061312 A1 | 3/2003 | Bodner | |
| 2003/0065919 A1 | 4/2003 | Albert | |
| 2003/0084009 A1 | 5/2003 | Bigus | |
| 2003/0135508 A1 | 7/2003 | Chorafakis et al. | |
| 2003/0135547 A1 | 7/2003 | Kent | |
| 2003/0158894 A1 | 8/2003 | Ziserman | |
| 2003/0187964 A1 | 10/2003 | Sage | |
| 2003/0200459 A1 | 10/2003 | Seeman | |
| 2004/0001493 A1 | 1/2004 | Cloonan | |
| 2004/0015592 A1 | 1/2004 | Selgas | |
| 2004/0024736 A1 | 2/2004 | Sakamoto | |
| 2004/0078695 A1* | 4/2004 | Bowers et al. | 714/39 |
| 2004/0225865 A1 | 11/2004 | Cox et al. | |

FOREIGN PATENT DOCUMENTS

| | | | |
|---|---|---|---|
| EP | 745929 A1 | 12/1996 | |
| EP | 0 762 281 A | 3/1997 | |
| EP | 0 810 755 A2 | 12/1997 | |
| EP | 0952521 A2 | 10/1999 | |
| EP | 0 973 296 A2 | 1/2000 | |
| EP | 0 993 725 A1 | 4/2000 | |
| EP | 1 011 230 A | 6/2000 | |
| EP | 1 012 726 A1 | 6/2000 | |
| EP | 1 026 867 A2 | 8/2000 | |
| EP | 1 047 226 A2 | 10/2000 | |
| EP | 1 090 492 A1 | 4/2001 | |
| EP | 1 091 526 A2 | 4/2001 | |
| GB | 2 368 692 A | 5/2002 | |
| JP | 8139757 A | * | 5/1996 |
| WO | WO 95/08794 | 3/1995 | |
| WO | WO 95 24802 A | 9/1995 | |
| WO | WO 97/49214 | 12/1997 | |
| WO | WO 98 18235 A | 4/1998 | |
| WO | WO 98/24208 | 6/1998 | |
| WO | WO 99/01968 | 1/1999 | |
| WO | WO 99/11003 | 3/1999 | |
| WO | WO 99/67931 | 12/1999 | |
| WO | WO 00/04665 | 1/2000 | |
| WO | WO 00/41091 | 7/2000 | |
| WO | WO 01/19031 A1 | 3/2001 | |
| WO | WO 01/47185 A2 | 6/2001 | |
| WO | WO 01/47186 A2 | 6/2001 | |
| WO | WO 02/47332 A2 | 6/2002 | |

OTHER PUBLICATIONS

Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.
Kennedy T W: "Network Operations & Management Tool Requirements for the 90s" Proceedings of the Network Operations and Management Symposium (NOMS). Memphis, Apr. 6-9, 1992, New York, IEEE, U.S. Vo. 1, 1992, pp. 122-132.
"FFST/2 Generic Alert Router for LAN and SNA Transports," IBM Technical Disclosure Bulletin, IBM Corp. New York, US, vol. 34, No. 11, Apr. 1, 1992, pp. 467 XP000303331, ISSN: 0018-8689.
Torrente S et al.: "Implementation of the ANSI TIM1.5 GBM-T1.214 within an ODBMS framework" Networking: Foundation foar the Future, San Francisco, Mar. 28-Apr. 1, 1993, Proceedings of the Annual Joint Conference of the Computer and Communications Societies (INFOCOM), Los Alamitos, Lee Comp. Soc. Press, US, vol. 2 CONF. 12, Mar. 28, 1993, pp. 875-884, XP010032227, ISBN: 0/8186-3580-).
Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044 the whole document.
Williams R: "Web Based Enterprise Management W101" DMTF 1999 Annual Conference, 'Online! Jun. 15-16, 1999, pp. 1-21.
PCT/US 01/45668—International Search Report dated Oct. 16, 2002.
PCT/US 01/45669—International Search Report dated Oct. 16, 2002.
PCT/US 01/45671—International Search Report dated Oct. 16, 2002.
PCT/US 01/45670—International Search Report dated Dec. 20, 2002.
PCT/US 01/45672—International Search Report dated Apr. 14, 2003.
PCT/US 01/45671—Written Opinion Dec. 13, 2002.
NOMS, IEEE 1992 Network Operations and Management Symposium, 1992, vol. 1, IEEE Communications Society, New York, USA.
HP OpenView for Windows Workgroup Node Manager User Guide, 3COM, Jan. 1997, Part No. 09-1114-000, Hewlett-Packard Co., Santa Clara, CA USA.
Administrator's Guide, Formulator 3.0, 2000-2002, Gold Wire Technology Inc.
User Guide, Formulator 1.0, 2000-2001, Gold Wire Technology Inc.
Superstack II Hub TR Network Management Module Installation Guide, 3COM Jan. 1997, Hewlett-Packard Co., Santa Clara, CA USA.
Initially Configuring the ATM Switch Router, Cisco, Oct. 19, 2000, pp. 1-42.
Common Information Model—A Developer's Perspecti ve, IEEE, 1998, p. 1.
Liu, Stephen, Cisco IOS Command Line Interface Tutorial, 1997, Small/Medium Business Solutions, www.cisco.com/warp/cpropub/45/tutorial.htm.
Yeong et al., Lightweight Directory Access Protocol, RFC 1487, Jul. 1993.
Managing Managed Network Services: The Service Provider Blind Spot; Infonetics Research, The Networking Information Source; Jun. 2000 (18 pages).
ISM Customer—Aware™ Query; CoManage Corporation; as of Dec. 5, 2000 (2 pages).
ISM Customer—Aware™ Provisioning; CoManage Corporation; as of Dec. 5, 2000 (2 pages).
ISM Customer—Aware™ Deep Discovery™; CoManage Corporation; as of Dec. 5, 2000 (2 pages).
ISM Customer—Aware™ Service Profiling; CoManage Corporation; as of Dec. 5, 2000 (2 pages).
ISM Customer—Aware™ Fault and Performance Management; CoManage Corporation; as of Dec. 5, 2000 (2 pages).
Lonvick, C. The BSD syslog Protocol. RFC 3164 [online], Aug. 2001 [retrieved on Mar. 25, 2002]. Retrieved from the Internet ,<url: HTTP://www.ietf.org/rfc/rfc3164.txt>.
Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.
Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.
Finseth, C. An Access Control Protocol, Sometimes called TACACS. RFC 1492 [online], Jul. 1993 [retrieved on Mar. 25, 2002]. Retrieved from the Internet <URL: http://www.cis.ohio-state.edu/cgi-bin/rfc/rfc1492.html>.
Anderson, B.A. TACACS User Identification Telnet Option. RFC 927 [online], Dec. 1984 [retrieved on Mar. 25, 2002]. Retrieved from the Internet <URL: http://www.ietf.org/rfc/rfc0927.txt>.
Rigney, C., et al. Remote Authentication Dial in User Service (RADIUS). RFC 2138 [online], Apr. 1997 {retrieved on Mar. 25, 2002. Retrieved from the Internet <URL: http://www.ietf.org/rfc/rfc2138.txt>.

Rigney, C., RADIUS Accounting. RFC 2139 [online], Apr. 1997 [retrieved on Mar. 25, 2002]. Retrieved from the Internet <URL: http://www.ietf.org/rfc/rfc2139.txt>.

Postel, J., and Reynolds, J. Telnet Protocol Specification. RFC 854 [online]May 1983 [retrieved on Mar. 25, 2002]. Retrieved from the Internet <URL: http://www.ietf.org/rfc/rfc0854.txt>.

Lewis, L., "*Policy-Based Configuration Management: A Perspective,from a Network Management Vendor*," http://www.simple-times.org./pub/simple-times/issues/8-1.html., pp. 7-27, 2000.

Waldbusser, ST., et al., "Policy Based Management MIB," http://www.ietf.org/internet-drafts/draft-ietf-snmpconf-pm-05.txt, pp. 1-102, 2001.

Strassner, J., *A New Paradigm for Network Management: Business Deriven Device Management*,[online], 2002, http://www.ssgrr.it/en/ssgrr2002s/papers.htm, http://www.ssgrr.it/en/ssgrr2002s/papers/162.pdf.

* cited by examiner

REDIRECTING DATA GENERATED BY NETWORK DEVICES

RELATED APPLICATIONS

The following commonly owned and assigned patent application are hereby incorporated by reference in their entirety:

1) U.S. Pat. No. 7,249,170, entitled System and Method for Configuration, Management and Monitoring of Network Resources, filed on Dec. 6, 2000;
2) U.S. Patent Publication No. 2002/0069271, entitled Event Manager for Network Operating System, filed on Dec. 6, 2000;
3) U.S. Pat. No. 7,054,946, entitled Dynamic Configuration of Network Devices to Enable Data Transfers, filed on Dec. 6, 2000;
4) U.S. Pat. No. 7,366,893, entitled Network Component Configuration and Management Method, filed on Dec. 6, 2000; and
5) U.S. Patent Publication No. 2002/0069367, entitled Network Operating System Data Directory, filed on Dec. 6, 2000.

FIELD OF THE INVENTION

The present invention relates generally to network systems. More particularly, but not by way of limitation, the present invention relates to systems and methods for capturing data generated by network devices such as routers and optical devices.

BACKGROUND OF THE INVENTION

Data dumps have long been a tool utilized by software and hardware engineers to identify errors within computer systems. For example, core dumps were once used as the primary method for debugging complex computer programs. Improvements in programming languages and the development of interactive debuggers, however, have reduced the use of core dumps for debugging most application programs. Nonetheless, core dumps and the capture of core dumps are still essential for programmers attempting to debug operating systems and other low level programs.

As operating systems become more sophisticated, the need for capturing and analyzing data dumps becomes increasingly more important, both in the general purpose computer environment and in the network device environment. For example, modern routers are configured to generate core dumps when certain errors are encountered or when the routers crash. Network administrators need to capture these core dumps. One solution to capturing core dumps includes hardwiring a write-out address, e.g., a TCP/IP address, in each individual router. Such a solution is employed by Cisco Systems and is illustrated in FIG. 1. In this type of system, when a router (such as router 105) encounters an error, it retrieves the hardwired write-out address from local storage 120 and writes the core dump to that address. Different routers are likely programmed with different hardwired addresses. For example, routers 105 and 110 can be programmed with the address of storage device 125, and router 115 can be programmed with the address of storage device 130. In this type of system, once the core dump is written out by the router 105, 110, 115, the addressed storage device 125, 130 must determine how to handle the incoming data. Often, the core dump is written to the storage device in a haphazard fashion, and the administrator is left to sort through an enormous amount of information.

As the size of networks grows, hardwiring each network device with a write-out address becomes more tedious, cumbersome and error prone. In many networks, hundreds of network devices should initially be configured with the appropriate hardwired write-out address to which core dumps can be written, and these network devices should be reconfigured each time that the associated storage devices are relocated, removed or otherwise altered. Moreover, in an effort to keep track of which network devices write to which storage devices, administrators are often forced to keep some sort of log that should be updated anytime that the configuration of the relevant storage devices is changed. That is, the log must be updated when storage devices are relocated, removed, added, etc.

The difficulties in managing these hardwired write-out addresses have become so staggering that many network administrators do not even initially configure the addresses and thereby sacrifice the ability to capture core dumps. Unfortunately, because network devices and their operating systems are becoming increasingly more sophisticated, failing to capture core dumps is no longer a viable option available to the network administrator. Accordingly, the network community has been scrambling to find solutions for efficiently capturing core dumps.

An alternate solution for capturing core dumps has been developed by Juniper Networks Inc. Juniper has designed routers with onboard, i.e., integrated, storage for recording core dumps. This basic configuration is illustrated in FIG. 2 wherein multiple routers 135 in the same network are each configured with their own integrated storage 140. Any core dump or other data dump generated by these routers 135 is written directly to the attached integrated storage 140 rather than to a hardwired write-out address. Thus, network administrators using this type of router do not need to configure each network device with a hardwired write-out address.

Although Juniper has solved some of the problems associated with hardwiring each network device with a write-out address, Juniper's solution introduces an entire new set of problems. For example, integrating storage directly into each router significantly increases the cost of each device. Additionally, by integrating storage directly into the router, the physical size of the router is increased. In fact, Juniper routers require a significantly larger amount of valuable rack space than a comparable router that does not include the integrated storage.

Even though Juniper's solution to capturing data dumps is plagued by significant problems, network administrators have been receptive to its solution for lack of a better option. Accordingly, the network community is in immediate need of a better option. In particular, the network community is in need of a system and method for efficiently and easily capturing data dumps generated by network devices.

SUMMARY OF THE INVENTION

To remedy the above described and other deficiencies of the current technology, a system and method for efficiently and easily capturing data dumps from network devices is disclosed. In one embodiment, the present invention includes a storage management device disposed between a network device and a storage device. The network device is programmed with a virtual address—associated with the storage management device—to which a data dump generated by that network device can be written. Because the virtual address can be mapped to the physical location of the storage management device, each network device within the relevant network can be configured to write to that virtual address rather than to a hardwired address that corresponds to a storage device. By simply remapping the virtual address to a new physical address, the storage management unit can be moved from one physical point on the network to another physical point on the network without updating the virtual address stored in the network devices.

Furthermore, the storage manager can be programmed with the addresses for those storage devices to which a data dump can be redirected. In this embodiment, upon receiving a data dump, the storage manager can redirect or otherwise transfer the data to one of those storage devices. Thus, the network devices never necessarily need to know the actual addresses for the storage devices that will store the data dump. In other embodiments, the storage manager can keep a record of each network device that generates a data dump and the location at which each data dump is stored. Network administrators can search a compilation of these records to locate the data dumps.

Accordingly, the present invention overcomes the problems with the present technology and addresses the needs of the network community. The above-described embodiments as well as other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
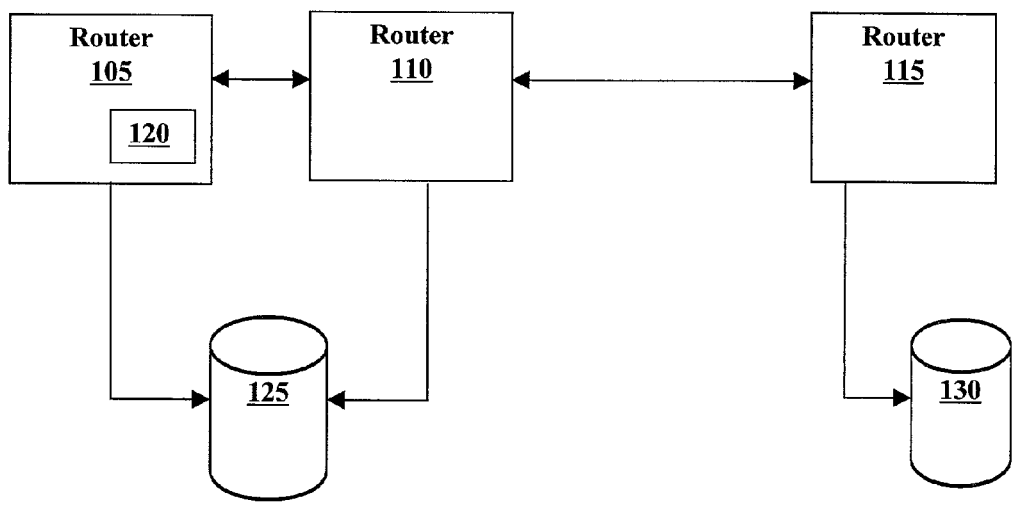
FIG. 1 illustrates a present network system that includes routers with hardwired write-out addresses.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalents and alternative constructions that fall within the spirit and scope of the invention as expressed in the claims.

Figure 3:
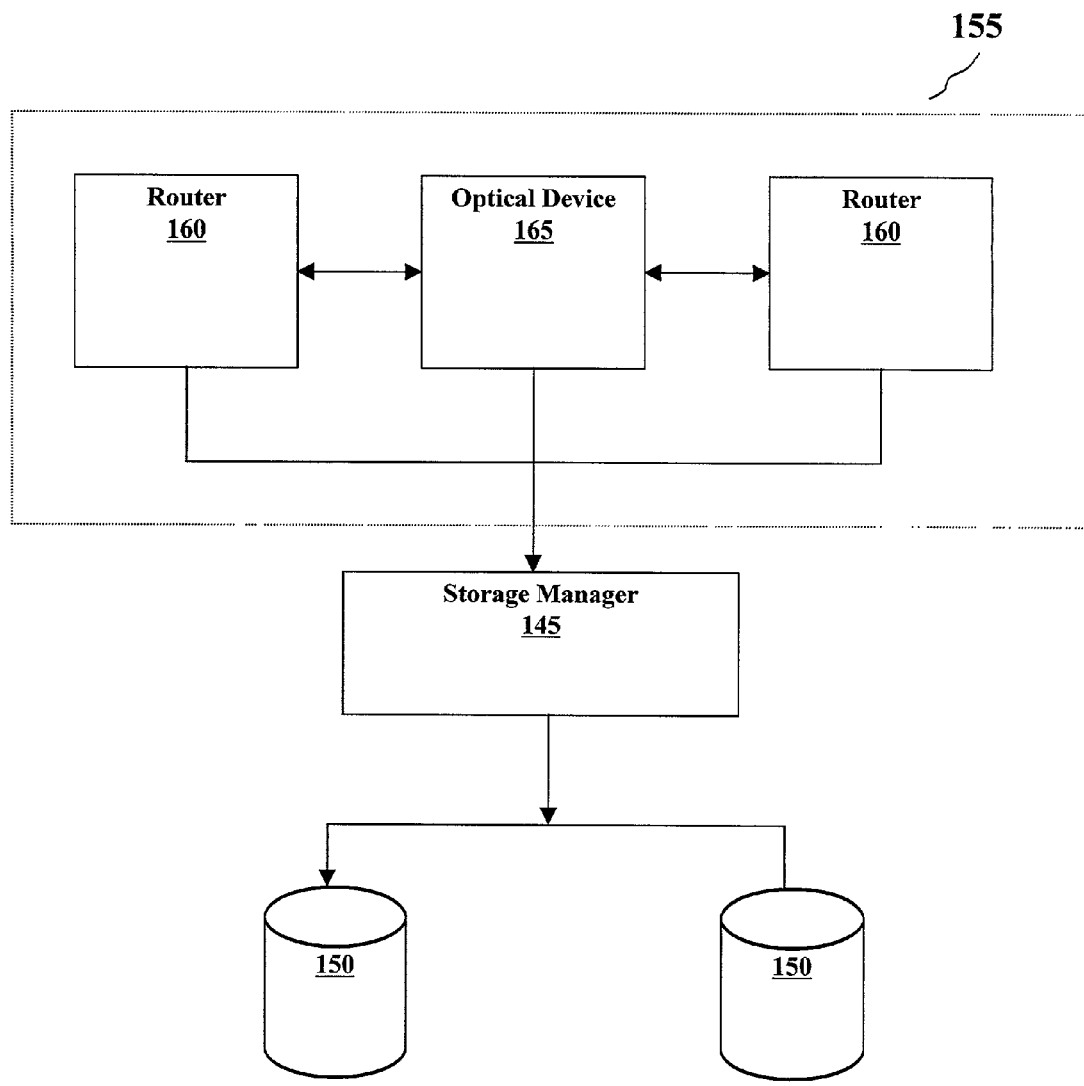
FIG. 3 illustrates a network system constructed in accordance with the principles of the present invention.

Referring now to FIG. 3, there is illustrated a network system constructed in accordance with the principles of the present invention. In this embodiment, a storage manager 145 is disposed between storage devices 150 and network devices 155 (comprised of routers 160 and optical device 165). Each of the network devices 155 can be configured to write a data dump to a virtual data dump address that corresponds to the storage manager 145. For example, each of the network devices 155 could be programmed with a domain name to which a data dump could be written. As is well known to those of skill in the art, this domain name can be mapped to an actual physical address such as an IP address. Accordingly, when the storage manager 145 is moved from one physical address to another physical address, the data dump address that is stored in the various network devices 155 does not necessarily need to be changed. Rather, the mapping between the virtual address and the new physical address should be updated.

Still referring to FIG. 3, the storage manager 145 can be programmed with the addresses of available storage devices 150 to which data dumps can be written. (For the purpose of this application, data dumps can include core dump information, system information, event logs, web site content, customer information, application programs, etc.) For any data dump received from a network device 155, the storage manager 145 can redirect that data dump to one of these available storage devices 150. Although the storage devices are shown directly connected to the storage manager 145, one skilled in the art can understand that the storage devices 150 can be distributed across a network (not shown). In such an embodiment, the storage manager 145 can be programmed with the network address, e.g., the IP address, of the actual storage devices 150. In other embodiments, however, the storage devices 150 can be directly attached to the storage manager 145 or attached through a local network (not shown).

The benefits of the system such as the one illustrated in FIG. 3 are quite substantial. For example, the network administrator can merely configure all network devices 155 (or some portion thereof) to write a data dump to the same virtual address. There is no need to configure each network device 155 with its own hardwired write-out address. Moreover, the administrator does not need to maintain a complicated log indicating which router writes to which storage device. Additionally, the reconfiguration of the network system to account for added, removed, or relocated storage becomes trivial. Instead of reconfiguring scores of network devices 155 when storage is added, removed or relocated, the network administrator need only make a change to the storage manager 145 indicating what storage is now available and where that storage is located. Further, by recording the location of the data dump in association with a network device identifier, a network administrator can locate data dumps for particular network devices with relative ease as compared to present systems.

Figure 2:
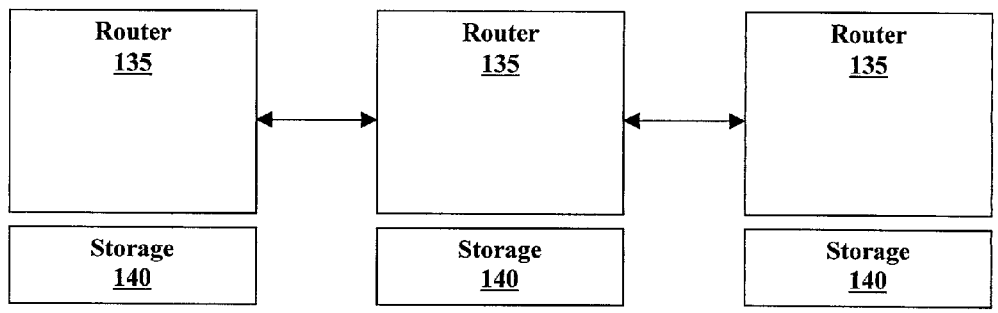
FIG. 2 illustrates a present network system that includes routers with integrated storage for capturing data dumps.

The present invention also provides significant benefits over network devices with integrated storage (element 135 in FIG. 2). For example, with the present invention, storage for data dumps does not need to be integrated with each individual network device. This results in the present invention realizing significant cost savings and size reduction over those systems with integrated storage. Moreover, the present invention offers better management of data dumps because of a more centralized data dump storage environment.

Figure 4:
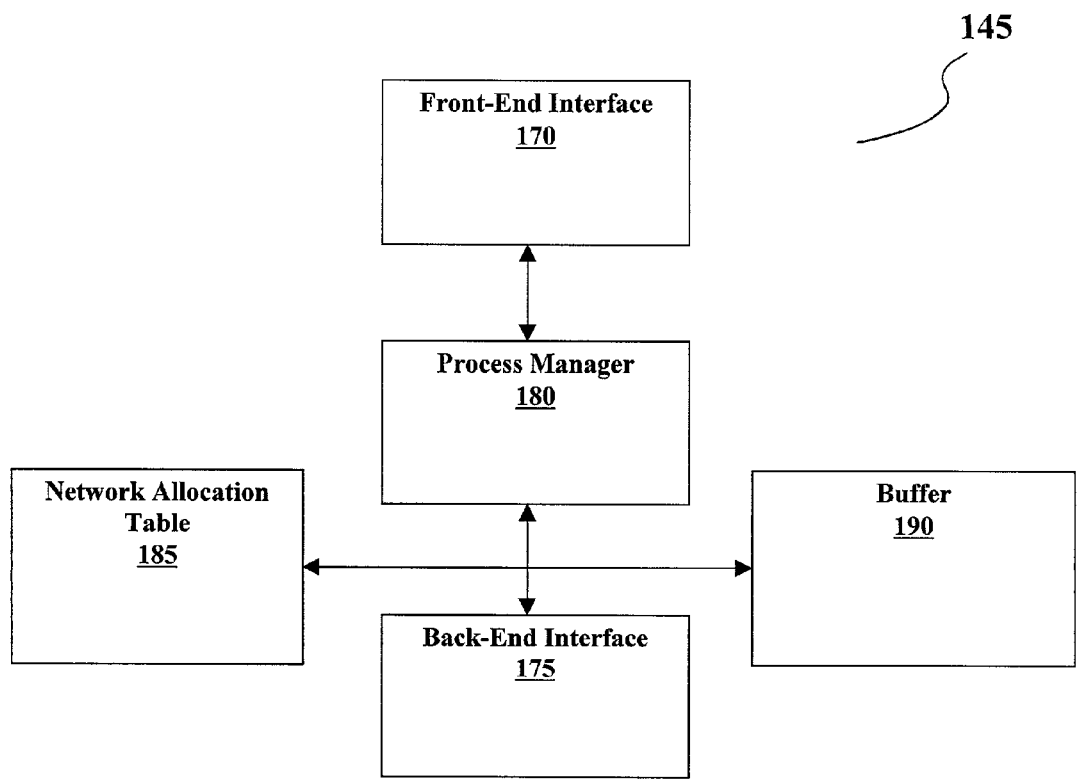
FIG. 4 illustrates in more detail the storage manager component illustrated in FIG. 3.

Referring now to FIG. 4, there is illustrated in more detail the storage manager 145 shown in FIG. 3. This embodiment of the storage manager 145 includes a front-end interface 170 for communicating with an attached network (not shown) and a back-end interface 175 for communicating with storage devices 150 (shown in FIG. 3). The front-end interface 170, for example, can communicate using any one of a number of communication protocols such as FTP, TFTP and HTTP. Similarly, the back-end interface 175 can communicate with the storage devices 150 in a variety of ways. For example, if a storage device 150 can interpret FTP, TFTP and/or HTTP, the back-end interface 175 can communicate using one of those protocols. Alternatively, the back-end interface 175 can communicate using, for example, fiber channel over IP in which fiber channel transmissions are wrapped in an IP protocol.

In addition to the front-end 170 and back-end interfaces 175, the storage manager 145 can include a process manager 180 that monitors for incoming data dumps and determines how to best redirect those data dumps. The process manager 180 can include a microprocessor (not shown) configured to run a daemon that continuously monitors for transmissions received at the front-end interface 170. Once the process manager determines that a data dump is being received at the front-end interface 170, the process manager 180 can then determine how to handle the incoming transmission. For example, the process manager 180 can determine to which associated storage device 150 (shown in FIG. 3) the data dump should be redirected. Alternatively, the process manager 180 could determine that the data dump should be buffered prior to redirecting it to the appropriate storage device 150.

In determining how to route an incoming data dump, the process manager 180 can access the network allocation table 185 that stores entries about the storage devices 150 (shown in FIG. 3) to which data dumps can be written. In one embodiment, the network allocation table 185 stores addresses, e.g., IP addresses, and indications of which blocks are free within those storage devices 150. Thus, the process manager 180 can quickly access the network allocation table 185 and locate available storage to which a data dump should be redirected.

In further embodiments, the process manager can cause an entry to be created in the network allocation table 185 each time a core dump is received. Such an entry could indicate from which network device 135 (shown in FIG. 3) the core dump is received and the address of the storage device 150 (shown in FIG. 3) to which the data dump was redirected. These entries could be accessed and searched by an administrator so that the administrator can locate the storage location of any data dump.

Still referring to FIG. 4, permanent storage may be temporarily unavailable when a data dump is received or portions of the data dump may be received before the process manager 180 can determine to which storage device 150 (shown in FIG. 3) the data dump should be redirected. In either of these cases, the data dump can be temporarily stored in the buffer 190, and after the process manager 180 determines to which storage device 150 the data dump should be written and that that device is ready to receive the data dump, the contents of the buffer 190 can be transferred. In other embodiments, however, the data dump can be redirected without buffering it within the storage manager 145.

Figure 5:
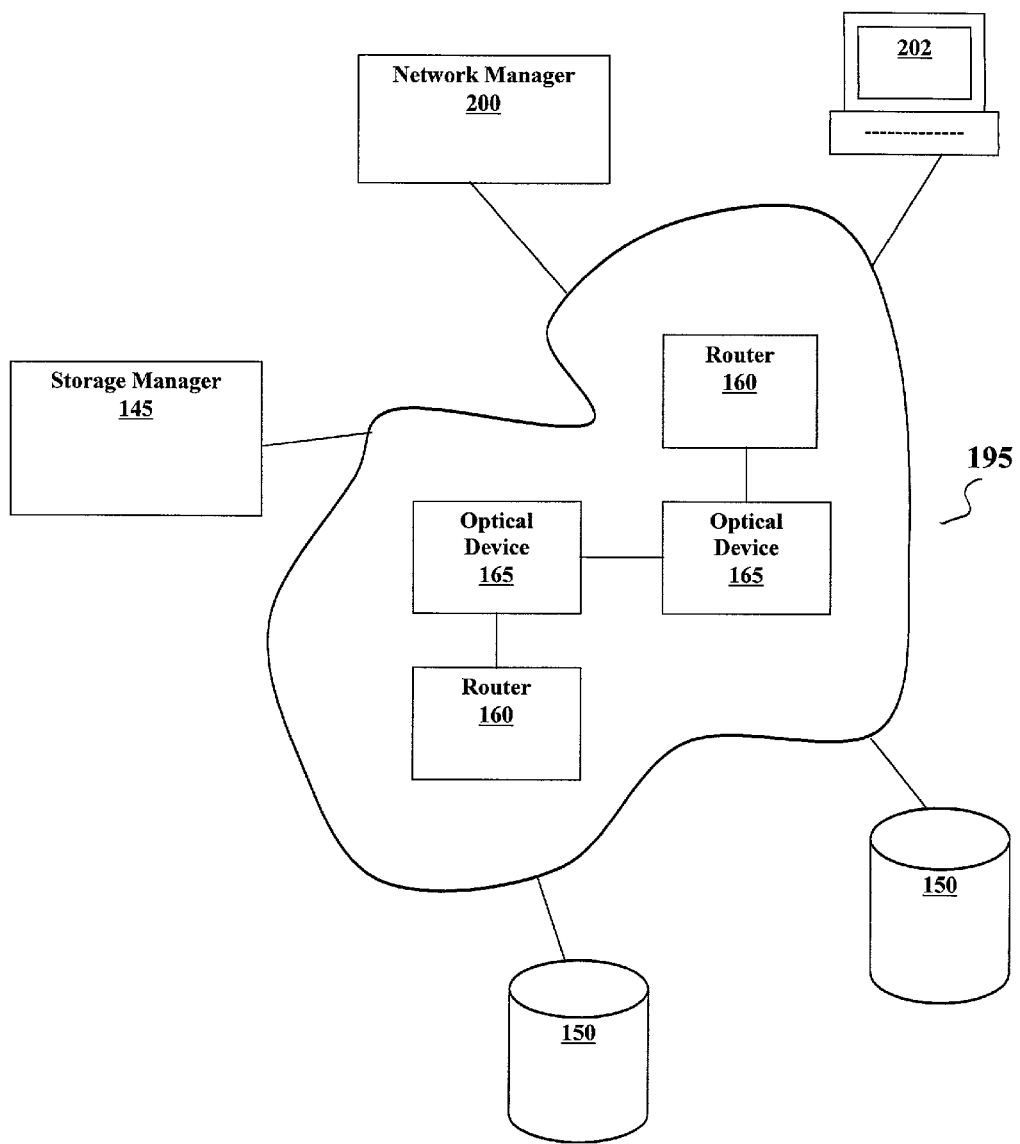
FIG. 5 illustrates an alternate embodiment of the present invention.

Referring now to FIG. 5, there is illustrated an alternate embodiment of the present invention. In this embodiment a storage manager 145 is connected to a network 195 that includes routers 160 and optical devices 165. Two storage devices 150 are also connected to the network 195.

Upon receiving a data dump from a network device 160, 165, the storage manager 145 can generate a message indicating the receipt of the data dump and transmit that message to a network manager 200. (The network manager 200 can be integrated with the storage manager 145 to form a single device.) Such a message would generally indicate the identity of the network device 160, 165 that generated the data dump and the identity of the storage device 150 to which the data dump was redirected. In particular, such a message could indicate the name of the network device 160, 165 generating the data dump, the address of the storage device 150 to which the data dump was written and a particular block within that storage device 150 at which the data dump has been stored.

After receiving a data dump message from the storage manager 145, the network manager 200 can initiate a set of predetermined actions. In fact, a network administrator 202 can configure the network manager 200 to perform virtually any action in response to receiving a message about a data dump. (The network manager 200 is described in detail in commonly owned and assigned patent application no. CNTW-005/00US entitled Network Component Configuration and Management Method, filed on Dec. 6, 2000, which is incorporated herein by reference.)

Figure 6:
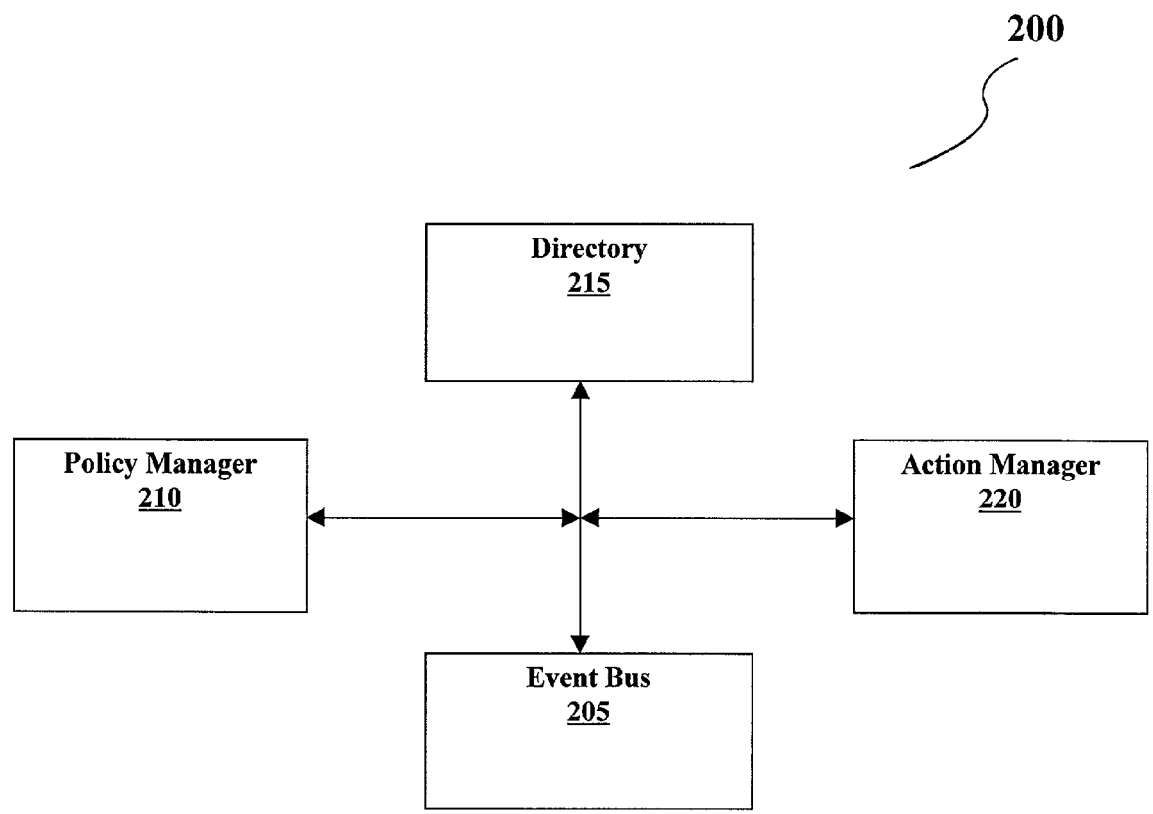
FIG. 6 illustrates in more detail the network manager component of FIG. 5.

Referring now to FIG. 6, there is illustrated in more detail the network manager 200 of FIG. 5. In this embodiment, the network manager includes an event bus 205 connected with a policy manager 210, a directory 215 and an action manager 220. The event bus 205 can receive data dump messages generated by the storage manager 145 (shown in FIG. 5) and/or individual network devices 160, 165 (also shown in FIG. 5). When a data dump message is placed on the event bus 205, that message can be compared against pre-established rules stored in the policy manager 210 to determine a proper response to the data dump message. Once the proper response is determined, that response is posted to the event bus 205 as a work order. This work order can then be retrieved from the event bus 205 by the action manager 220 and subsequently executed. For example, the rules stored in the policy manager 210 might indicate that a particular router is to be taken offline if it generates a core dump. Thus, when a message is placed on the event bus 205 indicating that that particular router has generated a core dump, the rule taking that router offline is retrieved from the policy manager 210, placed on the event bus 205 and executed by the action manager 220.

Figure 7:
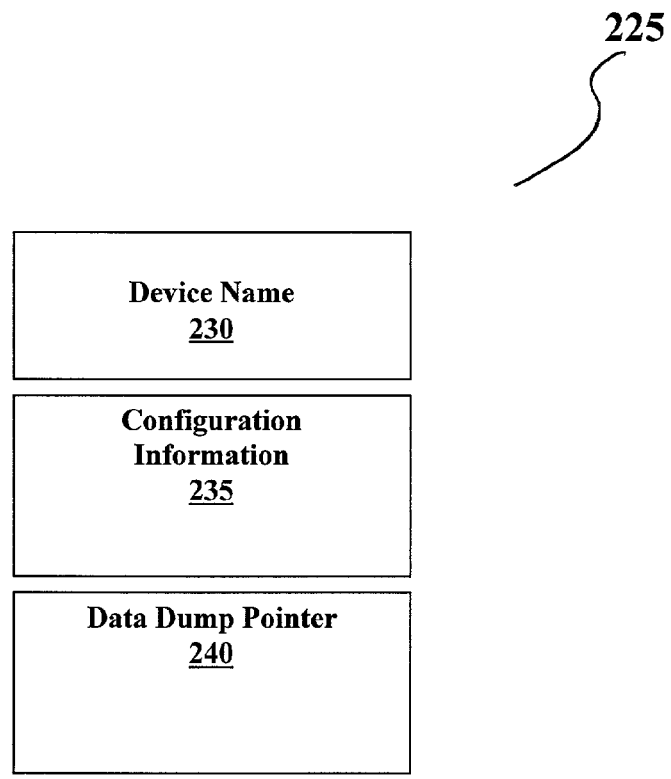
FIG. 7 illustrates an exemplary configuration record that can be stored in the directory of FIG. 6.

In further embodiments, the storage location of a data dump can be stored in a configuration record associated with the network device that generated the data dump. This configuration record along with the configuration records for the other network devices can be stored in the directory 215, which includes a central repository for storing configuration records for each of the network devices 160, 165 (shown in FIG. 5). An exemplary configuration record 225 is shown in FIG. 7. Such a record 225 could exist for each network device 160, 165, and could indicate a device's name 230 and its basic configuration information 235. Additionally, the configuration record 225 could also include a data dump pointer field 240 that stores a pointer to the storage location of any data dump generated by the particular network device associated with the configuration record. The data dump pointer field 250 could be populated with the storage device address received with a data dump message.

Figure 8:
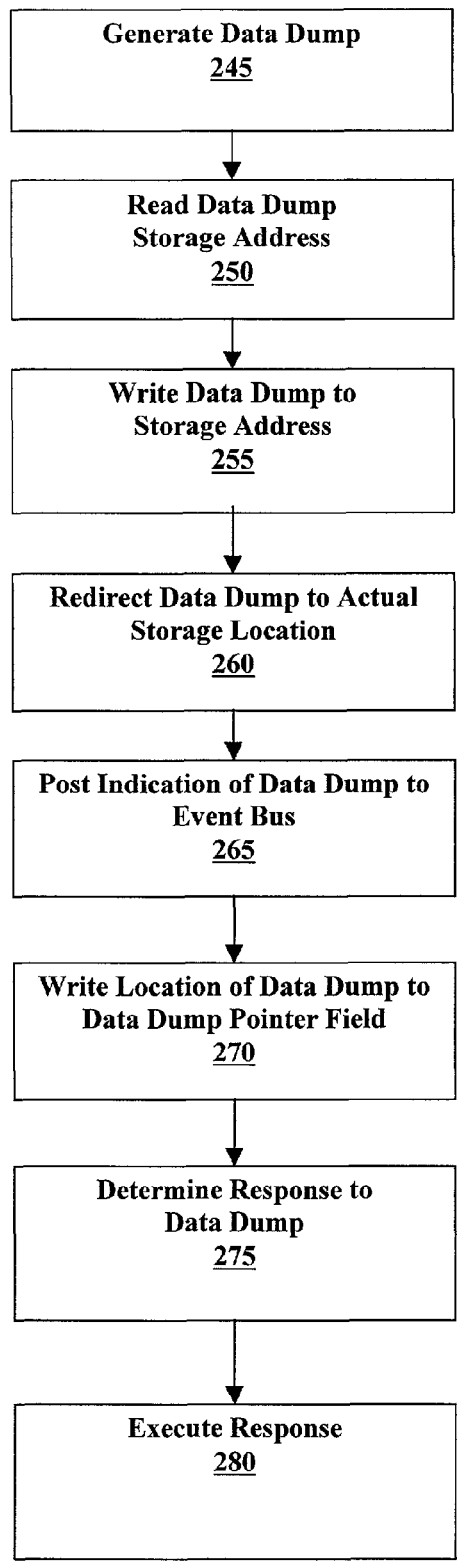
FIG. 8 is a flow chart of one method for capturing a data dump.

Referring now to FIG. 8, there is illustrated one method of capturing a data dump in accordance with the principles of the present invention. In this method, a particular network device 160, 165 (shown in FIG. 5) would generate a data dump (step 245) and determine the address, e.g., the virtual address, to which that data dump should be written (step 250). Next, the network device 160, 165 would actually write that data dump to the data dump address (step 255), which can correspond to the address of the storage manager 145 (shown in FIG. 5). Although in the presently preferred embodiment, the data dump address is a virtual address pointing to the storage manager 145, one skilled in the art could easily configure the data dump storage address to include an IP address.

Once the network device 160, 165 has written out the data dump to the virtual address, the storage manager 145 redirects that data to an associated storage device 150 (all shown in FIG. 5) (step 260). Next, the storage manager 145 posts a message regarding the data dump to the event bus 205 (shown in FIG. 6) of the network manager 200 (step 265). Once the message is received at the network manager 200, the storage location of the data dump can be written to the data dump pointer field 240 of the appropriate configuration record 225 (shown in FIG. 7) (step 270). Next, the network manager 200 can determine the proper response for dealing with the data dump generated by the particular network device 160, 165 (step 275), and once the proper response is determined, implement that response (step 280).

In conclusion, the present system provides, among other things, a system and method for efficiently and easily capturing data dumps generated by network devices. Moreover, the present system provides a system and method for automatically responding to a data dump. Those skilled in the art, however, can readily recognize that numerous variations and substitutions may be made to the invention, its use and its configuration to achieve substantially the same result as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for capturing error data generated by a router, the method comprising the steps of:
   receiving, at a location remote from the router, the error data generated by the router;
   recording an identity indicator for the router from which the error data was received;
   redirecting the received error data to a storage location; and
   recording, in a configuration record for the router, the identity of the storage location to which the error data was transferred.

2. The method of claim 1, further comprising the step of: writing the error data to a virtual address.

3. The method of claim 2, wherein the error data comprises a core dump from the router.

4. The method of claim 1, further comprising the step of: storing the received error data in the storage location.

5. The method of claim 1, further comprising the step of: recording an indicator for the error data in a configuration record that is unique to the router.

6. The method of claim 5, wherein the configuration record is stored remotely from the router.

7. The method of claim 1, wherein the step of redirecting comprises the step of:
   redirecting the received error data to a remote storage location.

8. The method of claim 1, further comprising the step of: posting an error data indicator to a network manager.

9. The method of claim 8, wherein the step of posting an error data indicator further comprises the steps of:
   posting the identity indicator to the network manager; and
   posting the identity of the storage location to the network manager.

10. The method of claim 8, further comprising the step of: executing a predefined action responsive to the error data indicator being posted to the network manager.

11. A system for capturing error data generated by a router, the system comprising:
    means for receiving the error data from the router;
    means for routing the received error data to a storage location;
    means for recording, in a configuration record for the router, the identity of the router from which the error data was received; and
    means for recording the address of the storage location in association with the recorded identity of the router.

12. The system of claim 11, further comprising:
    means for storing the routed error data.

13. The system of claim 11, further comprising:
    means for generating an indication that the error data was received from the router.

14. The system of claim 13, further comprising:
    means for determining a response to the generated indication.

15. The system of claim 14, wherein the determined response comprises at least one of resetting the router and taking the router offline.

16. The system of claim 11, further comprising:
    means for writing the error data to a virtual address.

17. The system of claim 16, further comprising:
    means for determining the virtual address to which the error data should be written.

18. The system of claim 11, wherein the means for receiving the error data is addressable via a virtual address.

19. The system of claim 11, further comprising:
    means for determining the address of the storage location.

20. The system of claim 11, further comprising:
    means for buffering the error data.

21. A method for capturing error data generated by a network-traffic device, the method comprising the steps of:
    receiving the error data from the network-traffic device;
    recording an identity indicator for the network-traffic device from which the error data was received;
    redirecting the received error data to a storage location; and
    recording, in a configuration record corresponding to the network-traffic device, an indication of the error data and an indication of the storage location to which the error data was transferred;
    wherein the identity of the storage location is recorded in association with the recorded identity indicator for the network-traffic device.

22. The system of claim 21, wherein the network-traffic device comprises a router.

23. The system of claim 21, wherein the network-traffic device comprises a switch.

* * * * *